United States Patent
Gibbs et al.

(10) Patent No.: US 9,469,480 B2
(45) Date of Patent: Oct. 18, 2016

(54) TROUGH TRAINING IDLER

(71) Applicant: ASGCO Manufacturing, Inc., Allentown, PA (US)

(72) Inventors: Aaron T. Gibbs, Easton, PA (US); Leroy C. Williams, Hellertown, PA (US)

(73) Assignee: ASGCO Manufacturing, Inc., Allentown, PA (US)

( * ) Notice: Subject to any disclaimer, the term of this patent is extended or adjusted under 35 U.S.C. 154(b) by 0 days.

(21) Appl. No.: 14/951,804

(22) Filed: Nov. 25, 2015

(65) Prior Publication Data

US 2016/0159574 A1    Jun. 9, 2016

Related U.S. Application Data

(60) Provisional application No. 62/086,955, filed on Dec. 3, 2014.

(51) Int. Cl.
*B65G 15/64* (2006.01)
*B65G 15/08* (2006.01)
(Continued)

(52) U.S. Cl.
CPC ............... *B65G 15/64* (2013.01); *B65G 15/08* (2013.01); *B65G 21/2063* (2013.01); *B65G 39/16* (2013.01)

(58) Field of Classification Search
CPC .. B65G 15/64; B65G 15/08; B65G 21/2063; B65G 21/2072; B65G 39/16
USPC .................................. 198/808, 826
See application file for complete search history.

(56) References Cited

U.S. PATENT DOCUMENTS

| 809,227 A | * | 1/1906 | Steckel | ............... B65G 39/125 198/826 |
| 1,255,659 A | * | 2/1918 | Stephens | ............. B65G 39/125 198/826 |
| 1,705,558 A | | 3/1929 | Cuddihy | |

(Continued)

FOREIGN PATENT DOCUMENTS

WO    WO96/09237    3/1996

OTHER PUBLICATIONS

International Search Report for corresponding PCT Application No. PCT/US2015/062607 dated Mar. 11, 2016.

(Continued)

*Primary Examiner* — Mark A Deuble
(74) *Attorney, Agent, or Firm* — Caesar Rivise, PC

(57) ABSTRACT

An apparatus and method for adjusting the trough angle of a conveyor belt transport mechanism and for automatically correcting for conveyor belt creep along the conveyor belt sides during belt operation. The apparatus and method are directed to an idler assembly that pivots through a high point over a base frame. The idler assembly includes a horizontal base strut and angled wing struts on each side of the base strut. Rotatably mounted on the horizontal base strut are a pair of parallel centered rollers that surround a centrally-located pivot point. Rotatably mounted on each angled wing strut is a respective conical-shaped wing roller wherein a lower end of the wing roller remains at a fixed distance from the wing element whereas the distance between the upper end and the angled wing strut is adjustable via a threaded rod using jam nuts to releasably secure the angled wing rollers at a desired angle. During belt operation, if conveyor belt creep occurs the idler assembly automatically pivots to correct and re-center the belt over the parallel-centered rollers.

16 Claims, 4 Drawing Sheets

(51) Int. Cl.
*B65G 39/16* (2006.01)
*B65G 21/20* (2006.01)

(56) References Cited

U.S. PATENT DOCUMENTS

| | | | |
|---|---|---|---|
| 1,963,099 A | 6/1934 | Robins | |
| 2,225,276 A | 12/1940 | Parker | |
| 2,561,641 A | 7/1951 | Thomson | |
| 2,815,851 A | 12/1957 | Yoshimura | |
| 3,294,218 A * | 12/1966 | Chantland | B65G 39/125 |
| | | | 198/826 |
| 6,173,830 B1 | 1/2001 | Cumberlege et al. | |
| 6,405,854 B1 | 6/2002 | Cumberlege | |
| 6,550,606 B2 * | 4/2003 | Tapp | B65G 39/12 |
| | | | 198/808 |
| 7,614,493 B2 * | 11/2009 | Dowling | B65G 39/16 |
| | | | 198/806 |
| 9,139,367 B2 * | 9/2015 | Swinderman | B65G 15/60 |
| 2002/0063042 A1 * | 5/2002 | Fischer | B65G 21/2054 |
| | | | 198/826 |
| 2011/0272250 A1 | 11/2011 | DeVries | |
| 2013/0284565 A1 | 10/2013 | Kuiper et al. | |

OTHER PUBLICATIONS

Hosch Tracker Roller System Type RG2 Installation and Operations Manual, Hosch-Fördertechnik GmbH, 2015.
Tapered Self-Aligning Idler Set, Hebei Xinshan Conveyor Machinery Co., Ltd., Dec. 21, 2011.

* cited by examiner

TROUGH TRAINING IDLER

CROSS-REFERENCE TO RELATED APPLICATIONS

This non-provisional application claims the benefit under 35 U.S.C. §119(e) of Application Ser. No. 62/086,955 filed on Dec. 3, 2014 entitled TROUGH TRAINING IDLER and whose entire disclosure is incorporated by reference herein.

BACKGROUND OF THE INVENTION

The present invention relates to relates generally to conveyor belt systems and more particularly, to an apparatus and method for adjusting the trough angle of a conveyor belt and for automatically centering a conveyor belt that drifts during operation.

Conveyor belts are used in a variety of industries to transport materials from one place to another. Generally, materials are deposited at one end of a conveyor and are transported to the other end, where they are discharged or otherwise removed from the conveyor belt. To assist in containing the material upon the conveyor belt during transport, the conveyor belt can be formed into a trough configuration. This is typically accomplished via the use of a center roller having angled idlers on each side of the center roller (see U.S. Pat. No. 2,225,276 (Parker)) or by having a Y-shaped support having idlers on each leg of the upper portion of the "Y" (see U.S. Pat. No. 6,405,854 (Cumberlege)). See also U.S. Pat. No. 1,705,558 (Cuddihy); U.S. Pat. No. 1,963,099 (Robins); U.S. Pat. No. 2,561,641 (Thomson); U.S. Pat. No. 2,815,851 (Yoshimura) and U.S. Pat. No. 6,173,830 (Cumberlege, et al.). In addition, due to the uneven loading of the content on the trough-configured conveyor belt, the sides of the conveyor may tend to "creep" along either one of the angled idlers, thereby mis-aligning the conveyor belt. To correct for this "creep" self-aligning tracking assemblies are introduced at predetermined locations along the trough-configured conveyor belts. See also Tracker Roller Systems Type R/RG/RC/RRC by Hosch Company LLLP of Oakdale, Pa. or the Tapered Self-Aligning Idler Set 2.6.1 by Hebei Xinshan Conveyor Machinery co. Ltd. of Hebei, China.

Other self-aligning conveyor belt systems do not use a trough configuration but use this swivel or rotating mechanism to restore belt alignment such as those shown in U.S. Patent Publication Nos. 2011/0272250 (DeVries) and 2013/0284565 (Kuiper, et al.).

However, there remains a need to provide the user with a means of adjusting the angle of the trough as well as a means of automatically centering the conveyor belt in the trough when the sides of the conveyor belt start to "creep" up the trough sides.

All references cited herein are incorporated herein by reference in their entireties.

BRIEF SUMMARY OF THE INVENTION

An apparatus for providing trough angle adjustment to a self-aligning tracker of a conveyor belt transport is disclosed. The apparatus comprises: a base strut having angled wing struts on either side of the base strut and forming an idler frame, wherein the idler frame is pivotable about a base frame; at least one center roller rotatably mounted, in a horizontal orientation, to the base strut; an idler rotatably mounted to a respective angled wing strut, wherein each idler has a first end positioned near the at least one center roller and also has a second end positioned at an elevation higher than the first end, wherein the at least one center roller and each of the idlers receives the conveyor belt thereon; and a rod that is displaceable through an aperture in each angled wing strut, wherein the rod has a distal end coupled to the second end and wherein the distal end can be displaced towards or away from the angled wing strut to effect a desired trough angle, and wherein the rod has a releasable securing mechanism for releasably securing the rod at the desired trough angle.

A method of adjusting a trough angle of a self-aligning tracker of a conveyor belt transport is disclosed. The method comprises: forming an idler frame that has at least one central roller and an angled idler on either end of the at least one central roller, wherein the idler frame receives the conveyor belt thereon; fixing an end of each angled idler that is located near the at least one central roller; making the other end of each angled idler movable with respect to an angled strut upon which the respective angled idler is rotatably mounted to permit adjusting an angle of each angled idler; and releasably securing the other end of each angled idler at a desired trough angle.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1:
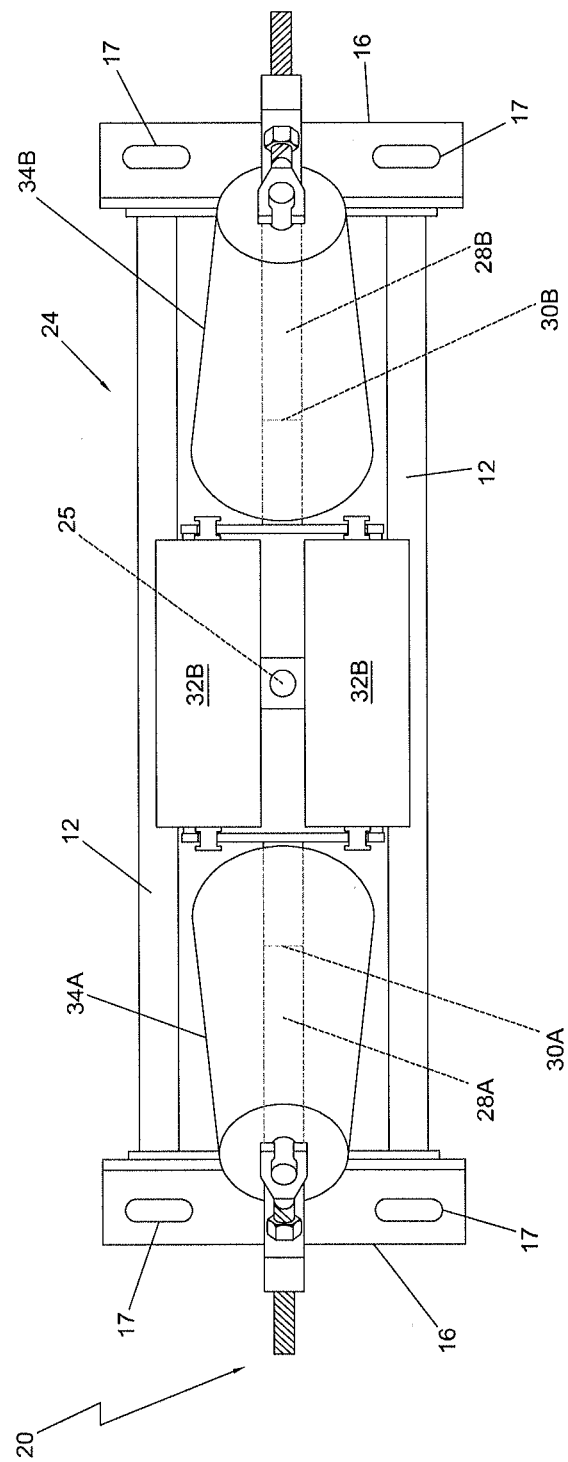
FIG. 1 is a top view of the trough training idler (TTI) of the present invention.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

Figure 2:
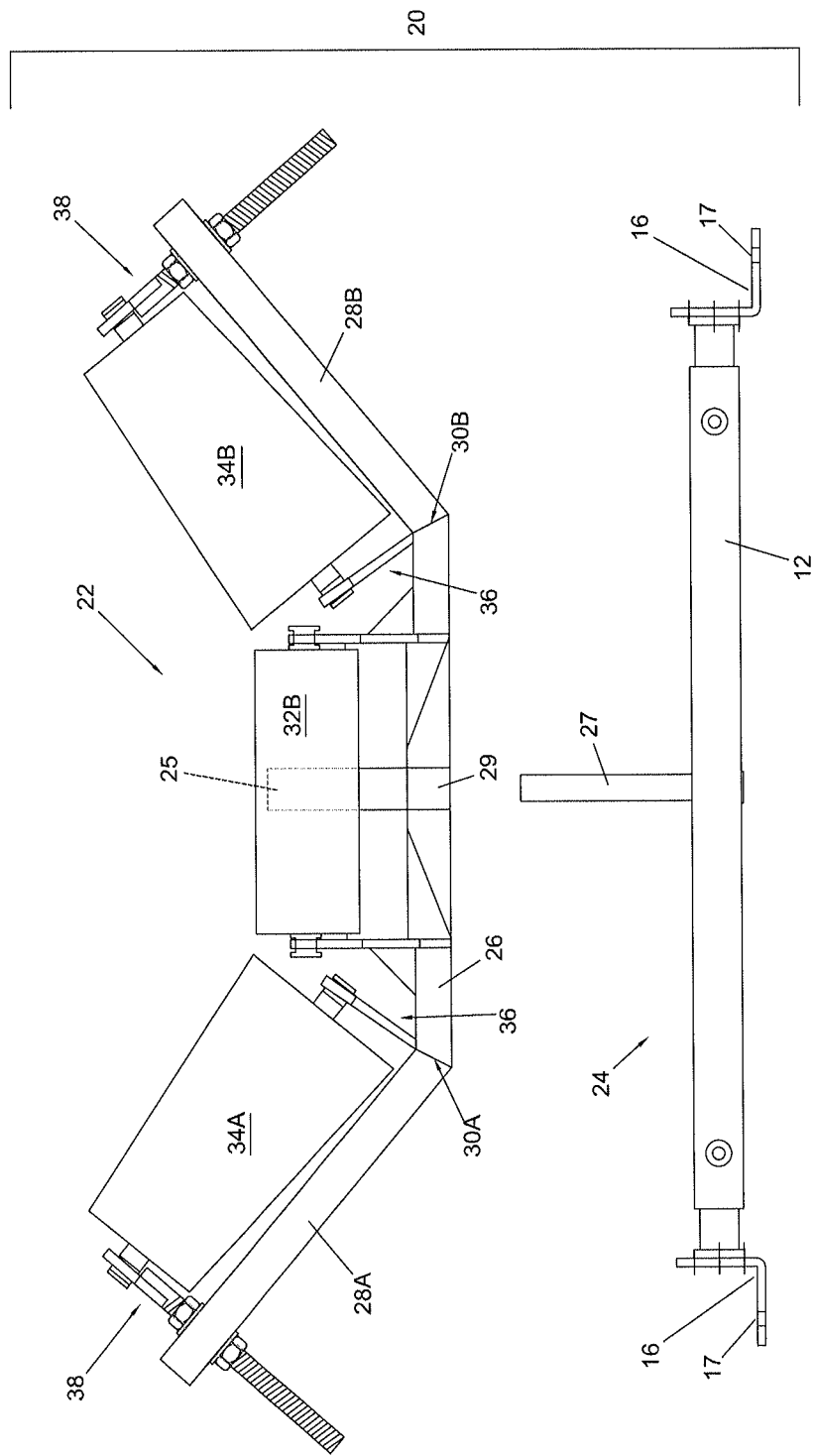
FIG. 2 is an exploded side view of the TTI of the present invention.

A trough training idler (TTI) 20 of the present invention is shown most clearly in FIG. 2. In particular, the TTI 20 comprises an idler frame 22 that is rotatable about a base frame 24. One of the key aspects of the present invention 20 is the "high" pivot point 25 of the idler frame 22 that permits the idler frame 22 to pivot while remaining stabilized over the base frame 24.

The base frame 24 is adjustable and, in particular, comprises an outer conduit 12 into which slides an adjustment leg 14. A mounting bracket 16 is secured to each end of the adjustment leg 14. Once the proper span of the adjustment leg 14 is determined, the adjustment leg 14 of the base frame 24 can be locked with respect to the outer conduit 12 and each mounting bracket 16 is secured to respective anchor points (not shown) via fasteners (also not shown) through apertures 17 in order to fix the base frame 24 into position. The base frame 24 further comprises a fixed vertical steel shaft 27 that is received in a corresponding sleeve 29 formed in the idler frame 22. Thus, when the shaft 27 is received in the sleeve 29, the idler frame 22 is able to pivot in either a clockwise or counterclockwise motion over the base frame 24 about a vertical axis 31 (FIG. 3) at the high pivot point 25.

The idler frame 22 itself comprises a base strut 26 (FIG. 2) having angled wing struts 28A and 28B on either side at respective "elbows" 30A and 30B. As will be discussed in detail later, these elbows 30A/30B also act as stops that prevent the idler frame 22 from any further clockwise or counterclockwise motion. The idler frame 22 further comprises a pair of central rollers 32A and 32B which are replaceable dual central rollers. These dual central rollers 32A/32B are parallel to each other and support the majority of a conveyor belt 15 (shown in phantom in FIG. 3) as it passes overhead. As can be seen most clearly in FIGS. 1 and 4, the sleeve 29 is centrally-located on the idler frame 22 and thus the presence of two central rollers 32A/32B, rather than a single central roller since a single central roller would prevent the central positioning of the sleeve 29. By way of example only, the top of the sleeve 29 is approximately 0.5 inches below the top of the central rollers 32A/32B.

Figure 3:
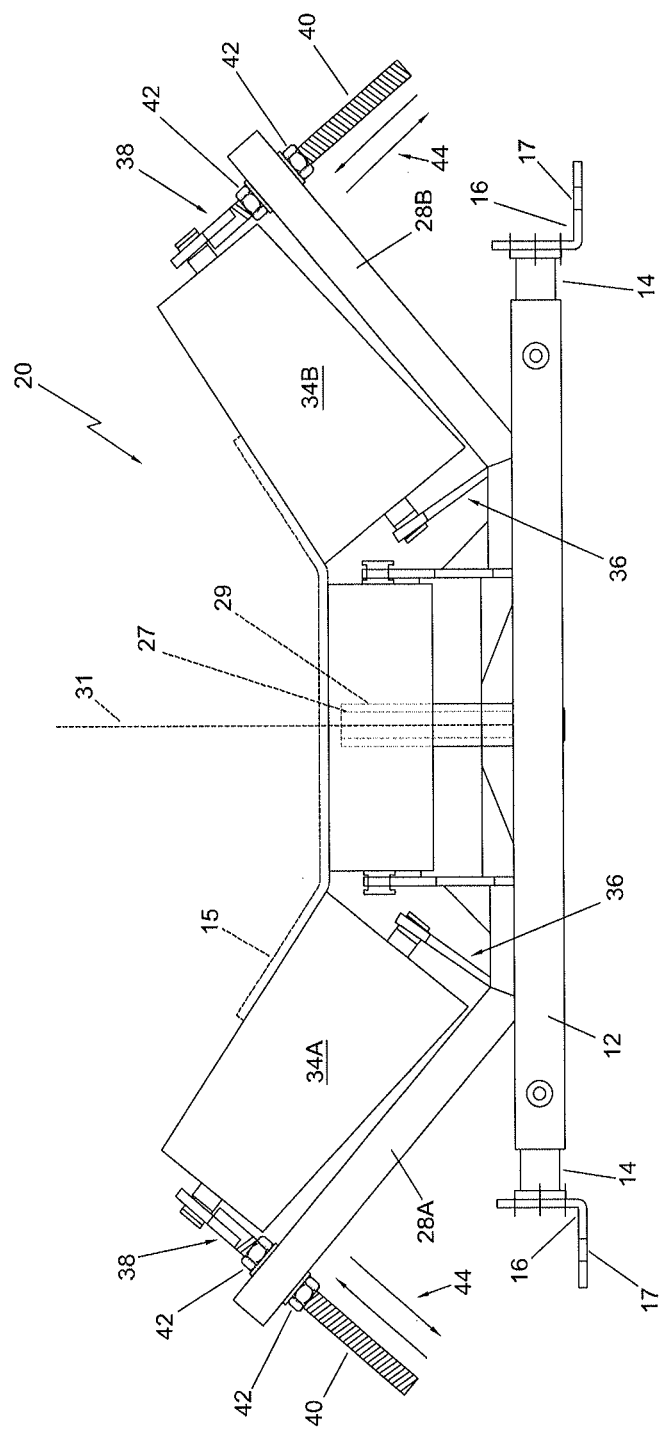
FIG. 3 is front view of the TTI of the present invention showing a conveyor belt (in phantom) disposed thereon.

On each side of the pair of central rollers 32A/32B is a conical-shaped wing idler 34A and 34B and each of these wing idlers supports the sides of the conveyor belt 15, as shown in FIG. 3, thereby creating a "trough" configuration of the conveyor belt 15 during its operation. Each wing idler 34A/34B is rotatably coupled to its respective angled wing strut 28A and 28B via spindle supports on each end of the conical-shaped wing idler 34A/34B. The inner spindle support 36 maintains a lower end of each wing idler 34A/34B at a fixed distance away from the corresponding angled wing struts 28A and 28B. However, each outer spindle support 38 is adjustable to permit the outer end of each conical-shaped wing idler 34A/34B to be displaced closer to, or away from, the corresponding angled wing struts 28A/28B. As a result, depending on the particular displacement, a desired trough angle for each side of the conveyor belt 15 can be established.

Figure 4:
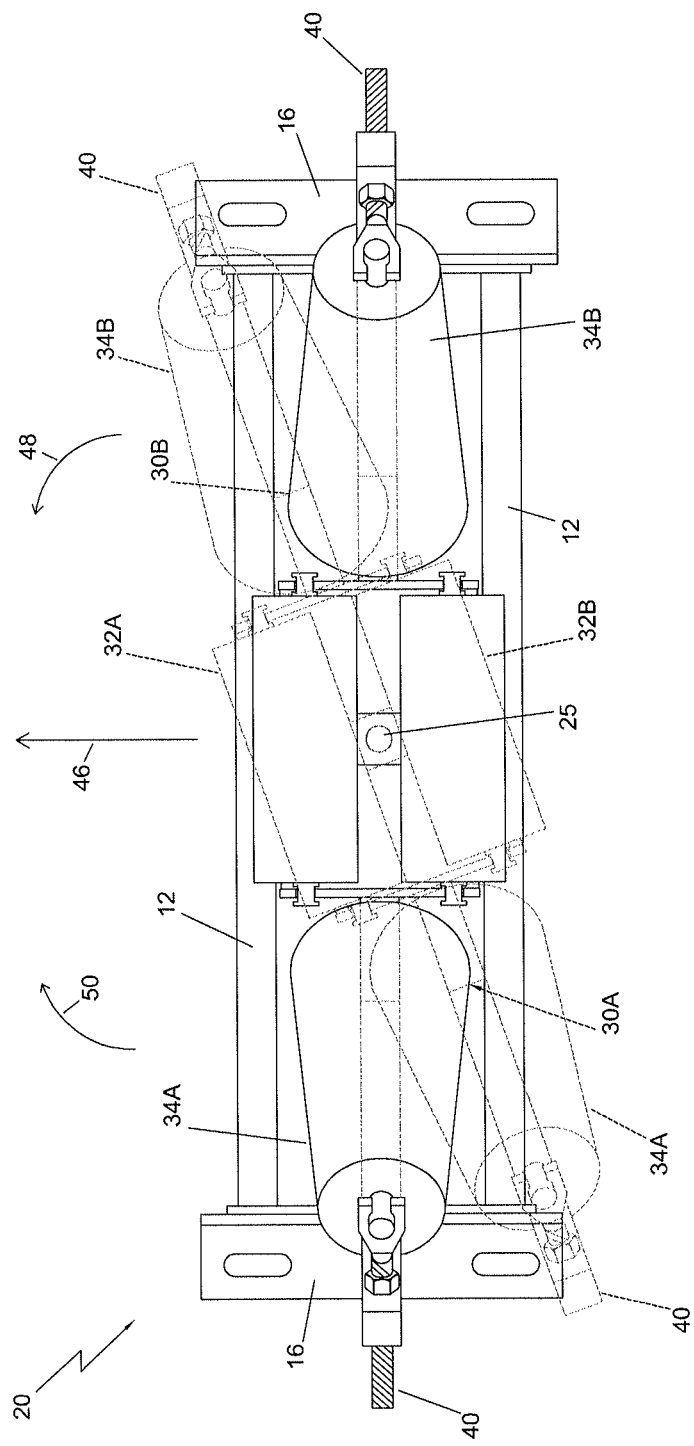
FIG. 4 is a top view of the TTI but showing how the TTI can rotate either clockwise or counterclockwise.

The outer spindle support 38 comprises a threaded shank 40 that passes through an aperture (not shown) in each wing strut 28A/28B. A pair of securing elements (e.g., jam nuts) 42 are provided on both sides of the respective struts 28A/28B to lock the threaded shank 40 at a particular trough angle. The operator of the conveyor belt 15 can adjust the trough angle of either or both sides of the conveyor belt 15 by loosening the jam nuts 42 on both sides of the wing struts 28A/28B. In particular, the operator would loosen the jam nuts 42, displace the threaded shank 40 in either direction indicated by arrows 44, and when the desired trough angle is achieved, the jam nuts 42 would be tightened. Once the conveyor belt 15 is operating, if, for some reason the conveyor belt 15 begins to creep up one of the conical wing idlers 34A or 34B, the increased load of the conveyor belt 15 on that conical wing idler 34A or 34B causes the TTI 20 to pivot forward to thwart the creep and to restore the conveyor belt 15 back to an evenly positioned configuration, as shown in FIG. 3. For example, as shown in FIG. 4, if conveyor belt 15 motion is designated by arrow 46 and if, during operation, the right side of the conveyor belt 15 were to creep up the right conical-shaped wing idler 34B, the conveyor belt loading would cause the TTI 20 to pivot counterclockwise (direction 48), thereby forcing the right side of the conveyor belt 15 to move downward, toward the dual center rollers 32A/32B. Conversely, if the left side of the conveyor belt 15 were to creep up the left conical-shaped wing idler 34A, the conveyor belt loading would cause the TTI 20 to pivot clockwise (direction 50), thereby forcing the left side of the conveyor belt 15 to move downward, toward the dual center rollers 32A/32B. Thus, the pivoting idler frame 22 forms an automatic self-centering device to maintain the conveyor belt 15 in a centered position.

In addition, as can see most clearly in FIG. 4, as the idler frame 22 pivots, a point is reached where the elbows 30A and 30B impact a corresponding outer conduit 12 of the base frame 24. By way of example only, FIG. 4 shows the elbow 30B impacting the "upper" outer conduit 12, while the elbow 30A impacts the "lower" outer conduit 12. Thus, these elbows 30A/30B act as stops to prevent any further clockwise or counterclockwise motion of the idler frame 22 with respect to the base frame 24.

While the invention has been described in detail and with reference to specific examples thereof, it will be apparent to one skilled in the art that various changes and modifications can be made therein without departing from the spirit and scope thereof.

What is claimed is:

1. An apparatus for providing trough angle adjustment to a self-aligning tracker of a conveyor belt transport, said apparatus comprising:
    a base strut having angled wing struts on either side of said base strut forming an idler frame, said idler frame being pivotable about a base frame;
    at least one center roller rotatably mounted, in a horizontal orientation, to said base strut;
    an idler rotatably mounted to a respective angled wing strut, each idler having a first end positioned near said at least one center roller and having a second end positioned at an elevation higher than said first end, said at least one center roller and each of said idlers receiving the conveyor belt thereon; and
    a rod that is displaceable through an aperture in each angled wing strut, said rod having a distal end coupled to said second end and wherein said distal end can be displaced towards or away from said angled wing strut to effect a desired trough angle, said rod having a releasable securing mechanism for releasably securing said rod at said desired trough angle.

2. The apparatus of claim 1 wherein said base frame comprises a vertical shaft and wherein said idler frame comprises a corresponding sleeve for receiving said vertical shaft having a free end, said corresponding sleeve having a closed end that seats upon said free end.

3. The apparatus of claim 2 wherein said at least one center roller comprises a pair of rollers positioned on opposite sides of said sleeve.

4. The apparatus of claim 3 wherein said closed end is located adjacent a top of said pair of rollers.

5. The apparatus of claim 1 wherein said rod is threaded and wherein said releasable securing mechanism comprises securing elements positioned on either side of said angled wing frame.

6. The apparatus of claim 1 wherein each of said idlers comprises a conical-shape.

7. The apparatus of claim 1 wherein said base strut is joined with said angled wing struts at elbows and wherein said elbows act as stops to prevent any further rotational motion when said elbows impact respective portions of said base frame.

8. A method of adjusting a trough angle of a self-aligning tracker of a conveyor belt transport, said method comprising:

forming an idler frame that has at least one central roller and an angled idler on either end of said at least one central roller, said idler frame receiving the conveyor belt thereon;

fixing an end of each angled idler that is located near said at least one central roller;

making the other end of each angled idler movable with respect to an angled strut upon which said respective angled idler is rotatably mounted to permit adjusting an angle of each angled idler; and releasably securing said other end of each angled idler at a desired trough angle.

9. The method of claim 8 further comprising the step of rotatably positioning said idler frame on top of a base frame to be rotatable about a vertical axis of said base frame.

10. The method of claim 9 wherein said step of rotatably positioning said idler frame on top of a base frame comprises forming a sleeve with closed end located at a height that is adjacent said at least one central roller and receiving a free end of a vertical shaft of said base frame within said sleeve.

11. The method of claim 10 wherein said step of forming an idler frame comprises positioning a pair of central rollers on opposite sides of said sleeve.

12. The method of claim 8 wherein said step of making the other end of each angled idler movable with respect to an angled strut comprises coupling one end of a rod to said other end and having a second end of said rod pass through an aperture within said angled strut, said rod being displaceable through said aperture.

13. The method of claim 12 wherein said rod is threaded and wherein a pair of jam nuts are threadedly engageable on said rod on opposite sides of said angled strut, said pair of jam nuts being loosened or tightened to adjust and achieve, respectively, a desired trough angle.

14. The method of claim 9 wherein said step of forming an idler frame comprises positioning at least one portion of said idler frame that impacts at least one portion of said base frame to act as a stop to rotatable motion.

15. The method of claim 14 wherein said step of positioning at least one portion of said idler frame comprises forming an elbow between a base strut that holds said at least one central roller and said angled strut, said elbow striking said at least one portion of said base frame if said idler frame is pivoted to a predetermined position.

16. The method of claim 15 wherein said step of positioning at least one portion of said idler frame comprises forming an elbow between said base strut and each of said angled struts.

\* \* \* \* \*